US008587452B2

(12) United States Patent
Wynans et al.

(10) Patent No.: US 8,587,452 B2
(45) Date of Patent: Nov. 19, 2013

(54) TIME COORDINATED ENERGY MONITORING SYSTEM UTILIZING COMMUNICATIONS LINKS

(75) Inventors: Arthur B. Wynans, Victoria (CA); Eric K. Haight, Victoria (CA); Simon H. Lightbody, Victoria (CA); Marc Ricci, Victoria (CA); Stewart J. Harding, Victoria (CA); Daniel A. Cumming, Sidney (CA); Martin A. Hancock, Victoria (CA)

(73) Assignee: Power Measurement Ltd., Saanichton, British Columbia (CA)

( * ) Notice: Subject to any disclaimer, the term of this patent is extended or adjusted under 35 U.S.C. 154(b) by 1799 days.

(21) Appl. No.: 11/274,705

(22) Filed: Nov. 14, 2005

(65) Prior Publication Data
US 2007/0236359 A1 Oct. 11, 2007

Related U.S. Application Data

(63) Continuation of application No. PCT/CA2004/000705, filed on May 11, 2004.

(60) Provisional application No. 60/469,766, filed on May 12, 2003, provisional application No. 60/488,700, filed on Jul. 18, 2003, provisional application No. 60/554,188, filed on Mar. 18, 2004.

(51) Int. Cl.
*G08B 23/00* (2006.01)

(52) U.S. Cl.
USPC ....... 340/870.03; 700/286; 709/248; 713/400

(58) Field of Classification Search
USPC ........ 340/870.02–870.03; 700/286, 296, 295; 709/224, 248; 375/354; 713/400
See application file for complete search history.

(56) References Cited

U.S. PATENT DOCUMENTS

| 4,589,075 A | 5/1986 | Buennagel ............... 700/286 |
| 4,804,957 A | 2/1989 | Selph et al. |

(Continued)

FOREIGN PATENT DOCUMENTS

| EP | 0395495 | 10/1999 |
| EP | 0957607 | 11/1999 |
| WO | WO 01/59965 | 8/2001 |

OTHER PUBLICATIONS

ABB Alpha Solid State Polyphase Meter, Product Bulletin 42-270-B, Sep. 15, 1995.

(Continued)

*Primary Examiner* — Albert Wong
(74) *Attorney, Agent, or Firm* — Brinks Gilson & Lione (57) ABSTRACT

A method, system and device for synchronizing a time period over which energy measurements are accumulated for an energy monitoring system including a plurality of energy monitoring devices is described. The method comprises transmitting a first radio frequency packet from a time reference device via at least a first and a second of the plurality of energy monitoring devices to a third of the plurality of energy monitoring devices. The method further comprises adjusting a time register within the third energy monitoring device based on the reception of the packet. The method further comprises accumulating a measure of energy consumption by the third energy monitoring device of a load coupled with the third energy monitoring device. The method further comprises transmitting the measure of energy consumption from the third energy monitoring device via at least a fourth and a fifth of the plurality of energy monitoring devices to a data aggregation device. The method further comprises identifying by the data aggregation device an aggregate measure of energy consumption consumed by the load over the time period.

14 Claims, 4 Drawing Sheets

(56) References Cited

U.S. PATENT DOCUMENTS

| | | | |
|---|---|---|---|
| 5,032,833 A | 7/1991 | Laporte | |
| 5,563,506 A | 10/1996 | Fielden et al. | 342/142 |
| 5,644,514 A | 7/1997 | Abo et al. | 702/124 |
| 5,673,252 A | 9/1997 | Holowick et al. | |
| 5,684,466 A | 11/1997 | Keating et al. | 340/662 |
| 5,736,847 A | 4/1998 | Van Doorn et al. | 324/142 |
| 5,768,148 A | 6/1998 | Murphy et al. | |
| 5,808,558 A | 9/1998 | Meek et al. | 340/870.01 |
| 5,862,391 A | 1/1999 | Salas et al. | |
| 5,949,230 A | 9/1999 | Kobayashi et al. | 324/72.5 |
| 6,018,700 A | 1/2000 | Edel | 702/60 |
| 6,105,093 A | 8/2000 | Rosner et al. | |
| 6,154,710 A | 11/2000 | Kobayashi et al. | 702/65 |
| 6,157,721 A | 12/2000 | Shear et al. | |
| 6,178,362 B1 | 1/2001 | Woolard et al. | |
| 6,233,327 B1 | 5/2001 | Petite | 379/155 |
| 6,272,552 B1 | 8/2001 | Melvin et al. | |
| 6,278,357 B1 | 8/2001 | Croushore et al. | 375/259 |
| 6,298,376 B1 | 10/2001 | Rosner et al. | |
| 6,301,527 B1 | 10/2001 | Butland et al. | |
| 6,321,272 B1 | 11/2001 | Swales | |
| 6,373,238 B2 | 4/2002 | Lewis et al. | 324/107 |
| 6,373,834 B1 | 4/2002 | Lundh et al. | |
| 6,437,692 B1 | 8/2002 | Petite et al. | 340/540 |
| 6,462,713 B2 | 10/2002 | Porter et al. | 343/719 |
| 6,470,283 B1 | 10/2002 | Edel | 702/64 |
| 6,535,983 B1 | 3/2003 | McCormack et al. | |
| 6,553,418 B1 | 4/2003 | Collins et al. | |
| 6,587,884 B1 | 7/2003 | Papadopoulos et al. | |
| 6,590,891 B1 | 7/2003 | Jacquet et al. | |
| 6,618,578 B1 | 9/2003 | Petite | 455/92 |
| 6,618,709 B1 | 9/2003 | Sneeringer | |
| 6,628,764 B1 | 9/2003 | Petite | 379/106.01 |
| 6,640,308 B1 | 10/2003 | Keyghobad et al. | |
| 6,650,249 B2 | 11/2003 | Meyer et al. | 340/870.28 |
| 6,671,586 B2 | 12/2003 | Davis et al. | 700/295 |
| 6,671,635 B1 | 12/2003 | Forth et al. | |
| 6,714,977 B1 | 3/2004 | Fowler et al. | |
| 6,762,675 B1 | 7/2004 | Cafiero et al. | |
| 6,792,337 B2 | 9/2004 | Blackett et al. | |
| 6,961,641 B1 | 11/2005 | Forth et al. | |
| 6,985,087 B2 | 1/2006 | Soliman | 340/870.02 |
| 6,996,154 B2 | 2/2006 | Haas | 375/132 |
| 7,142,129 B2* | 11/2006 | Hall et al. | 340/853.3 |
| 7,181,517 B1 | 2/2007 | Iavergne et al. | |
| 7,327,558 B2 | 2/2008 | Kennedy et al. | |
| 7,447,762 B2 | 11/2008 | Curray et al. | |
| 2001/0015640 A1 | 8/2001 | Hemminger | 324/142 |
| 2001/0038343 A1 | 11/2001 | Meyer et al. | 340/870.02 |
| 2002/0019712 A1 | 2/2002 | Petite et al. | 702/61 |
| 2002/0019725 A1 | 2/2002 | Petite | 702/188 |
| 2002/0027504 A1 | 3/2002 | Davis et al. | |
| 2002/0063635 A1 | 5/2002 | Shincovich | 340/870.02 |
| 2002/0071296 A1 | 6/2002 | Hemminger | 363/34 |
| 2002/0109608 A1 | 8/2002 | Petite et al. | 340/870.02 |
| 2002/0150110 A1 | 10/2002 | Inbar et al. | 370/401 |
| 2002/0169643 A1 | 11/2002 | Petite et al. | 705/5 |
| 2003/0063723 A1 | 4/2003 | Booth et al. | 379/106.03 |
| 2003/0067725 A1 | 4/2003 | Horvath et al. | 361/65 |
| 2003/0078029 A1 | 4/2003 | Petite | 455/404 |
| 2003/0098679 A1 | 5/2003 | Odaohhara | 323/384 |
| 2003/0174067 A1 | 9/2003 | Soliman | 340/870.02 |
| 2003/0179135 A1 | 9/2003 | Louhi | 342/359 |
| 2003/0226050 A1 | 12/2003 | Yik et al. | |
| 2004/0001008 A1 | 1/2004 | Shuey et al. | 340/870.02 |
| 2004/0001532 A1 | 1/2004 | Mason, Jr. et al. | 375/136 |
| 2004/0024717 A1 | 2/2004 | Sneeringer | |
| 2004/0227621 A1 | 11/2004 | Coupe et al. | 340/310.01 |
| 2004/0229578 A1 | 11/2004 | Lightbody et al. | 455/127.1 |

OTHER PUBLICATIONS

Dranetz Power Platform® PP1 & PP1E with TASKCard®-8000 Operator's Manual Revision A, Apr. 15, 1997.
Dranetz Power Platform® 4300 with TASKCard® 808 User's Guide, pp. ii-146, Jul. 1998.
Deposition of Erich W. Gunther, pp. 1-250, Nov. 14, 2008.
Dranetz Brochure, "Total Electrical System Management 8000-2", pp. 1-3.
Dranetz Power Platform® PP1 and PP1E TASKCard®-PQPLUS Operator's Manual Revision A, Apr. 15, 1997.
Dranetz Brochure, "Tomorrow's Technology Working for You Today", pp. 1-11, 1994.
BMI Brochure, "PowerProfiler™ 3030(A)", pp. 1-2, 1994.
BMI 3030/3060 Power Profiler User's Guide, pp. 1-8, 1990.
Dranetz OM-PC-PP1 PC PP1 Communication and Analysis Software Operator's Manual, pp. 1-6, Mar. 15, 1994.
Dranetz Brochure, "Power Platform® PP1-R", pp. 1-2.
DRAN-SCAN® 2000 Version 3.x, Power Quality Monitoring System Installation and Startup Guide, pp. ii-43, Nov. 1998.
Dranetz Power Platform® PP1-R User's Guide Revision A, Nov. 1998.
Dranetz Brochure, "Power Platform 4300 with TASKCard 808 Demand/Energy and Harmonic Analysis", pp. 1, 1996.
Dranetz Power Platform® Model 4300 TASKCard® PQLite Operator's Manual Revision A, Jan. 15, 1997.
Dranetz Power Platform® 4300 TASKCard® PQLite User's Guide Revision B, May 1, 2002.
7100/7100S PQNode® User's Guide, pp. iii-33, 1998.
8010 PQNode User's Guide, Revision A, pp. iii-33, 1998.
Power Measurement Ltd., 3720 ACM Advanced Power Instrumentation Package, pp. 1-12, Sep. 14, 1992.
Brochure, Model 3600A Power Line Disturbance Monitor, pp. 1-5.
Liebert Brochure, Model 3600A Portable Programmable Power Line Disturbance Monitor, pp. 1-2, 1985.
Franklin Electric Service Manual for Model 3600 Power Line Disturbance Monitor, pp. 1-28.
Brochure, "DataNodes™ EPQ Series, A Clear and Open Window to Enhanced Power Quality, Energy and More", pp. 1.
Melhorn et al., "Accessing Power Quality Information and Monitoring Results Using the World Wide Web or a Private Corporate Web", pp. 1-12.
Dranetz Series 5500 InfoNode® User's Guide Revision D, 1999.
Signature System™ Brochure, "Information. Knowledge. Power.", pp. 1-9, 1999.
Dranetz Series 5500 DualNode User's Guide Revision C, 2002.
Dranetz EPQ DataNode® Series User's Guide Revision D, 2000.
Dranetz Power Platform, PP1 SM-PP1 Service Manual, Feb. 1, 1995.
Dranetz Power Platform 4300 Service Manual, Revision B, May 1, 2002.
KV S-Base Meters, pp. 1-2, Sep. 1999.
GE kV Vector Electricity Meter, Product Description, Option Board Installation Procedures, Operating Instructions, Maintenance Instructions and Cite Analysis Guides, 1997.
Manual, "kV Vector Electricity Meter with the Site Genie Monitor".
Gunther et al., "Application of Advanced Characterization Alogrigthms, UCA and Internet Communications Technology At the Point of Power Quantity and Quality Measurement", *Presented at EPRI 1999 PQA Conference*, Charlotte, NC, pp. 1-16, 1999.
Gunther et al., "Application of Advanced Alogrigthms and Internet Communications Technology at the Point of Power Measurement," http:/www.pqmonitoring.com/papers/ieee99sm/, IEEE Summer Meeting 1999, Jul. 20, 1999, 23 pages.
Dranetz Series 5500 InfoNode User's Guide, Revision D, 2000.
Dranetz Power Evaluation Software User's Guide, Revision H, 2000.
Dranetz Brochure, "Series 626 Universal Disturbance Analyzer", pp. 1-16.
Dranetz 8800 PowerScope® Users Guide, 1992.
Manual, "TM-115000-G1 vol. 2—Service Manual Model 658 Power Quality Analzyer, Revision A," Mar. 1, 1995.
Dranetz 658 PQ Analyzer User's Guide, Revision A, Feb. 15, 1997.
Dranezt Brochure, "Power Platform 4300 Handheld Power Analysis", pp. 1-6, 1995.
"Electronic Energy Meter with Powerline Modem on DSP56F80x", Preliminary Information Application Brief, pp. 1-2, 2000.
Square D Bulletin, "Powerlogic® Series 4000 Circuit Monitor", pp. 1-6, Apr. 2000.

(56) References Cited

OTHER PUBLICATIONS

Square D Bulletin, "Powerlogic Ethernet Communication Card", pp. 1-2, Aug. 2000.
"Powerlogic® Advanced Power Reliability Solutions," Square D Schneider Electric, brochure, 2000, 6 pages.
"Powerlogic® Circuit Monitor—Series 2000," Class 3020, Square D Schneider Electric, brochure, 6 pages.
"Powerlogic® Power Meter," Class 3020, Square D Schneider Electric, brochure, 1998, 3 pages.
"Powerlogic® Metering and Monitoring Devices," Square D Schneider Electric, brochure, 2000, 3 pages.
"Powerlogic® Power Monitoring and Control System," Square D Schneider Electric, brochure, 1998, 8 pages.
"Powerlogic® Series 4000 Circuit Monitor," Square D Schneider Electric, brochure, 2000, 4 pages.
"Digest," Square D Schneider Electric, product catalog, Mar. 2000, 10 pages.
"Powerlogic®Series 4000 Circuit Monitor Now Available with Ethernet Communications Card," Square D Schneider Electric, News Release, Jul. 20, 2000, 2 pages.
"Powerlogic®Ethernet Communications Card," Square D Schneider Electric, Instruction Bulletin, Sep. 2000, 59 pages.
"Powerlogic®Series 4000 Circuit Monitor," Square D Schneider Electric, brochure, Apr. 2000, 6 pages.
"Powerlogic®Ethernet Communication Card," Square D Schneider Electric, brochure, Aug. 2000, 2 pages.
"Powerlogic® Ethernet Communication Card," Square D Schneider Electric, brochure, Nov. 2004, 2 pages.
"Powerlogic® Circuit Monitor Series 4000, Instruction Bulletin No. 63230-300-200, Feb. 2000 Now Available with Ethernet Communications Card," Square D Schneider Electric, News Release, Jul. 20, 2000, 282 pages.
"Powerlogic® Ethernet Communications Card," Schneider Electric, Instruction Bulletin No. 63230-304-200, Sep. 2000, 70 pages.
"Powerlogic® Circuit Monitor Series 4000 Installation Manual," Schneider Electric, Instruction Bulletin No. 63230-300-209B1, Dec. 2005, 110 pages.
"Powerlogic® Circuit Monitor Series 4000 Installation Manual," Schneider Electric, Instruction Bulletin No. 63230-300-21281, Dec. 2005, 234 pages.
"Powerlogic® Ethernet Communications Card," Schneider Electric, Instruction Bulletin No. 63230-314-202A4, Jan. 2006, 14 pages.
"Powerlogic® Ethernet Communications Card," Schneider Electric, Instruction Bulletin No. 63230-304-204A4, Jan. 2006, 46 pages.
"Ge kV2 Multifunction Electricity Meter," GE Industrial Systems, GEH-7277, Product Description, Operating Instructions, Maintenance Instructions, Upgrading, Site Analysis Guides, Diagrams, Dec. 2000.
Report of Richard Bingham dated Jun. 18, 2009 (pp. 1-56 of 71 (56 pages), and Appendix A (9 pages) (65 pages total)).
Report of Michael O. Warnecke dated May 27, 2009.
Tele-Service News, dated Aug. 2002, Section: No. 8, vol. 14—"Ultra-Wideband Growth Predicted to Explode", 1 page.
Dr. Fontana, Multispectral Solutions, Inc.—History of UWB Technology—"A Brief History of UWB Communications" pp. 1-10, printed Jul. 1, 2004.
Patrick Mannion, CommsDesign EE Times "Ultrawideband facts and fictions", dated Feb. 1, 2002, pp. 1-4, printed Jul. 1, 2004.
Ian Cameron, Electronics Times, "Ultrawideband radio attacks spectrum drought", dated Sep. 26, 2002, 5 pages.
Dave Farber, Interesting-People Message "IP: Ultrawideband Squeezes In", dated Aug. 16, 2002, pp. 1-4, printed Jul. 1, 2004.

David G. Leeper, Scientific American.com, Wireless Data Blaster, dated May 4, 2002, pp. 1-4, obtained from http://www.sciam.com/print_version.cfm?articleID=0002D51D-0A78-1CD4-B4A8809EC5, printed Jul. 1, 2004.
Elster, "A3 ALPHA® Meter With Network Collector Capabilities", Specifications, © 2003 by Elster Electricity, LLC, Raleigh, NC, Aug. 2003, 2 pages.
Elster, EnergyAxis® System Architecture, 1 page.
Elster, "EnergyAxis® System Technology to Empower Utilities," brochure, Elster Electricity, LLC, Raleigh, NC, 6 pages.
Elster "REX™ Meter", Specifications, © 2003 by Elster Electricity, LLC, Raleigh, NC, Aug. 2003, 2 pages.
Elster "Elster Electricity Announces New EnergyAxis® System with Intelligent Two-Way Communications" Corporate profile, © 2003 by Elster Electricity, LLC, Raleigh, NC, Aug. 2003, 1 page.
Elster Press Release Sep. 8, 2003, "Elster Electricity Introduces EnergyAxis® System for Residential and Small C&I Metering Automation", Elster Electricity, LLC, Raleigh, NC, 2 pages.
Kreiss Johnson brochure, "Open advancing substation automation", © 2003 Kreiss Johnson Technologies, Inc., San Diego, CA, 13 pages.
PCT International Search Report for International Application No. PCT/US2004/23006, 5 pages.
"Powerlogic® Advanced Power Reliability Solutions," Square D Schneider Electric, brochure, 2000, 3 pages double sided.
"Powerlogic® Circuit Monitor—Series 2000," Class 3020, Square D Schneider Electric, brochure, 3 pages double sided.
"Powerlogic® Power Meter," Class 3020, Square D Schneider Electric, brochure, 1998, 2 pages double sided.
"Powerlogic® Metering and Monitoring Devices," Square D Schneider Electric, brochure, 2000, 2 pages double sided.
"Powerlogic® Power Monitoring and Control System," Square D Schneider Electric, brochure, 1998, 4 pages double sided.
"Powerlogic® Series 4000 Circuit Monitor," Square D Schneider Electric, brochure, 2000, 3 pages double sided.
"Powerlogic® Series 4000 Circuit Monitor Now Available with Ethernet Communications Card," Square D Schneider Electric, News Release, Jul. 20, 2000, 2 pages.
"Powerlogic® Series 4000 Circuit Monitor," Square D Schneider Electric, brochure, Apr. 2000, 6 pages.
"Powerlogic® Ethernet Communication Card," Square D Schneider Electric, brochure, Aug. 2000, 2 pages.
"Powerlogic® Circuit Monitor Series 4000," Square D Schneider Electric, Instruction Bulletin, Feb. 2000, 264 pages; and specifically, "Chapter 6—Communications Connections" (pp. 57-70).
"Powerlogic® Circuit Monitor Series 4000 Installation Manual," Schneider Electric, Instruction Bulletin No. 63230-300-212B1, Dec. 2005, 234 pages.
"PowerPlus Alpha® Meter," *ABB Network Partner*, brochure (May 1997) (6 pages).
QUAD4® Plus/MAXsys™ *Products User's Guide*, Chapter 1 Overview (2 pages).
"ALPHA Stars™, National Wireless Communications for Remote Metering," *ABB Information Systems*, Bulletin (24 pages).
"AIN Alpha, High Function Multi-Tariff Solid State Electricity Meter," *ABB Network Partner*, PB 42-280-Ib, pp. 1-20.
"Alpha Solid State Polyphase Meter (Watts, VARs, VA)," *ABB Network Partner*, Product Bulletin, Sep. 15, 1995 (12 pages).
"Powerlogic® Series 4000 Circuit Monitor," Square D/Schneider Electric, Bulletin No. 3020HO0001, Apr. 2000 (6 pages).
"Web-Enabled Power Management Solutions," Square D/Schneider Electric, Product Brochure, Jan. 2002 (8 pages).

\* cited by examiner

TIME COORDINATED ENERGY MONITORING SYSTEM UTILIZING COMMUNICATIONS LINKS

RELATED APPLICATIONS

This application is a continuation under 35 U.S.C. §§120, 271 and 365 of Patent Cooperation Treaty patent application no. PCT/CA2004/000705, filed on May 11, 2004, which was published at WO 2004/099723, in English.

This application is further related to and claims benefit of priority under 35 U.S.C. §119(e) of Provisional U.S. patent applications Ser. No. 60/469,766, filed May 12, 2003, Ser. No. 60/488,700, filed Jul. 18, 2003 and Ser. No. 60/554,188, filed Mar. 18, 2004 which are hereby incorporated by reference.

FIELD OF THE INVENTION

The present invention relates to retrieving energy consumption information from monitoring devices. More specifically, the present invention relates to methods, devices and systems capable of retrieving time correlated energy consumption information.

BACKGROUND

In facilities, e.g. buildings or installations, where a significant amount of power is used among a variety of units, it would be advantageous to allow the building owner to allocate energy costs to the different units, i.e. consumers, within the facility. For a commercial office building, these units may include the different tenants within the building or the common loads for the facility, such as the elevators or HVAC systems. For an industrial facility, these units may include the different production lines, machines or processes within the facility. As opposed to allocating costs based on a fixed or formulaic approach (such as pro-rata, e.g. dollars per square foot or based on the theoretical consumption of a process/machine), an allocation based on actual measurements using appropriate monitoring devices may result in more accurate and useful information as well as a more equitable cost distribution.

Both installation and ongoing, i.e. operational and maintenance, costs for these monitoring devices are important considerations in deciding whether a monitoring system is worth the investment. While monitoring devices may be read manually, which does not increase the installation cost, manual data collection may increase on-going/operational costs. Alternatively, monitoring devices may be interconnected and be automatically read via a communications link. However, typical communication links require wiring to interconnect the devices which increases the installation cost.

Emerging wireless mesh (or ad-hoc) networking technologies can be used to reduce the installation costs of monitoring devices while providing for automated data collection. Also called mesh topology or a mesh network, mesh is a network topology in which devices/nodes are connected with many redundant interconnections between network nodes. Using wireless interconnections permits simpler and cost-effective implementation of mesh topologies wherein each device is a node and wirelessly interconnects with at least some of the other devices within its proximity using RF based links. Mesh networking technologies generally fall into two categories: high-speed, high bandwidth; and low speed, low bandwidth, low power. The first category of devices are typically more complex and costly that the second. Since energy monitoring does not typically require high speed/high bandwidth communication, the second category of devices is often sufficient in terms of data throughput.

Energy monitoring devices may include electrical energy meters that measure at least one of kWh, kVAh, kVARh, kW demand, kVA demand, kVAR demand, voltage, current, etc. Energy monitoring devices may also include devices that measure the consumption of water, air, gas and/or steam.

SUMMARY

The present invention is defined by the following claims, and nothing in this section should be taken as a limitation on those claims. By way of introduction, the preferred embodiments described below relate to an energy monitoring device for reporting energy consumption over a time period. The energy monitoring device comprises current interface circuitry operative to sense current flow in at least one power line. The energy monitoring device further comprises at least one analog to digital converter coupled with the current interface circuitry and operative to produce digital representations of the current flow. The energy monitoring device further comprises a processor coupled with the at least one analog to digital converter and operative to calculate at least one measure of energy consumption using the digital representations. The energy monitoring device further comprises a memory register coupled with the processor and operative to store local time for the energy monitoring device. The energy monitoring device further comprises radio frequency interface circuitry coupled with the processor and operative to transmit the measure of energy consumption via at least a second and a third energy monitoring device to a data aggregation device. The radio frequency interface circuitry is further operative to receive a packet containing a time reference transmitted via at least a fourth and a fifth energy monitoring device from a time reference device and the processor is operative to adjust the memory register based on the time reference.

The preferred embodiments further relate to a method of synchronizing a time period over which energy measurements are accumulated for an energy monitoring system including a plurality of energy monitoring devices is described. The method comprises transmitting a first radio frequency packet from a time reference device via at least a first and a second of the plurality of energy monitoring devices to a third of the plurality of energy monitoring devices. The method further comprises adjusting a time register within the third energy monitoring device based on the reception of the packet. The method further comprises accumulating a measure of energy consumption by the third energy monitoring device of a load coupled with the third energy monitoring device. The method further comprises transmitting the measure of energy consumption from the third energy monitoring device via at least a fourth and a fifth of the plurality of energy monitoring devices to a data aggregation device. The method further comprises identifying by the data aggregation device an aggregate measure of energy consumption consumed by the load over the time period.

The preferred embodiments further relate to a system capable of at least one of executing the method or incorporating the device.

Further aspects and advantages of the invention are discussed below in conjunction with the preferred embodiments.

DETAILED DESCRIPTION OF THE PRESENTLY PREFERRED EMBODIMENTS

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

One problem with low speed/low power/low bandwidth mesh networking technologies is that, although the bandwidth of the network is sufficient for transmitting energy related data, the overall network, i.e. end to end, latency or the variation in latencies over time or over different network paths, may be significant. Such ad-hoc transmission paths and resultant latencies may interfere with the transmission of data which is characterized by, or is sensitive to, a temporal component or otherwise based on a chronological data component, such as the time or sequence of data acquisition. This may result in data being delivered with significant delay relative to the time it was acquired and/or relative to the delivery of other data. For example, when attempting to measure energy demand, it is desirable to align the measurement to certain time boundaries (for instance, a 15 minute boundary). This means that all of the data generated/acquired within a given boundary should be reported to a central aggregation point where it can be aggregated and reported as the demand for that boundary. If the data is time-stamped, then the central computer can wait as long as it takes to receive the data and then aggregate the data based on the time stamps to determine in which demand window the data belongs. However, if the time stamps are inaccurate due to the inaccuracy of the clock in the monitoring device, the data from that device may be incorrectly aggregated to the wrong demand window resulting in inaccurate reporting. Therefore, time synchronizing either the devices themselves, or identifying the demand for given intervals at a central computer may be necessary. Synchronization of the monitoring devices with a central time authority may be performed by broadcasting time synchronization data to all of the devices or requiring the monitoring devices to periodically communicate with the central time authority to retrieve synchronization signals. However, if the data path through the mesh network from the central computer to the monitoring devices includes delays (for instance 10s of seconds) and the delays between various devices are variable, it may become difficult to time synchronize the monitoring devices accurately enough for a given desired accuracy. Where the energy data is not time stamped by the monitoring device, the data must be received by the central aggregation point within a window of time to be properly aggregated into the demand for a given period. Network delays may cause difficulties with identifying the time period for which any given piece of data from a monitoring device relates. Further, packets may arrive out of order due to the fact that each packet may follow a different path through the network.

The following description details various mechanisms for generating closely aligned/synchronized demand measurements from multiple electrical monitoring devices which are in communication with a central computer through a mesh network. It will be clear to those skilled in the art that the mechanisms defined herein are also applicable to monitoring other parameters indicative of energy consumption. The demand calculation for a given device may be performed entirely by the electrical monitoring device, partially performed by the central computing device or performed entirely by the central computing device based on energy readings retrieved from the electrical monitoring device(s).

In the following description, two relevant time periods will be generally referenced. "Monitor time" is the time present in a memory location in a particular monitoring device, i.e. the "clock" time known to the monitoring device, also referred to as "device time" or "Dt". "Computer time" is the time present in a memory location in a central computer, i.e. the "clock" time known to the central computer, also referred to as "Ct". Computer time will generally be the real or accurate time to which it is desirable to reference all measurements and recordings. The computer time may be synchronized to time references such as GPS satellites or an atomic clock, or other available time authority. Alternatively, the Dt of any particular device may be used as the reference.

Time within a device may be represented in many formats such as hours/minutes/seconds, number of seconds since a start time (for instance Jan. 1, 1970 at midnight), or a free running counter value coupled with a conversion value/function between the free running counter value and real time.

Figure 1:
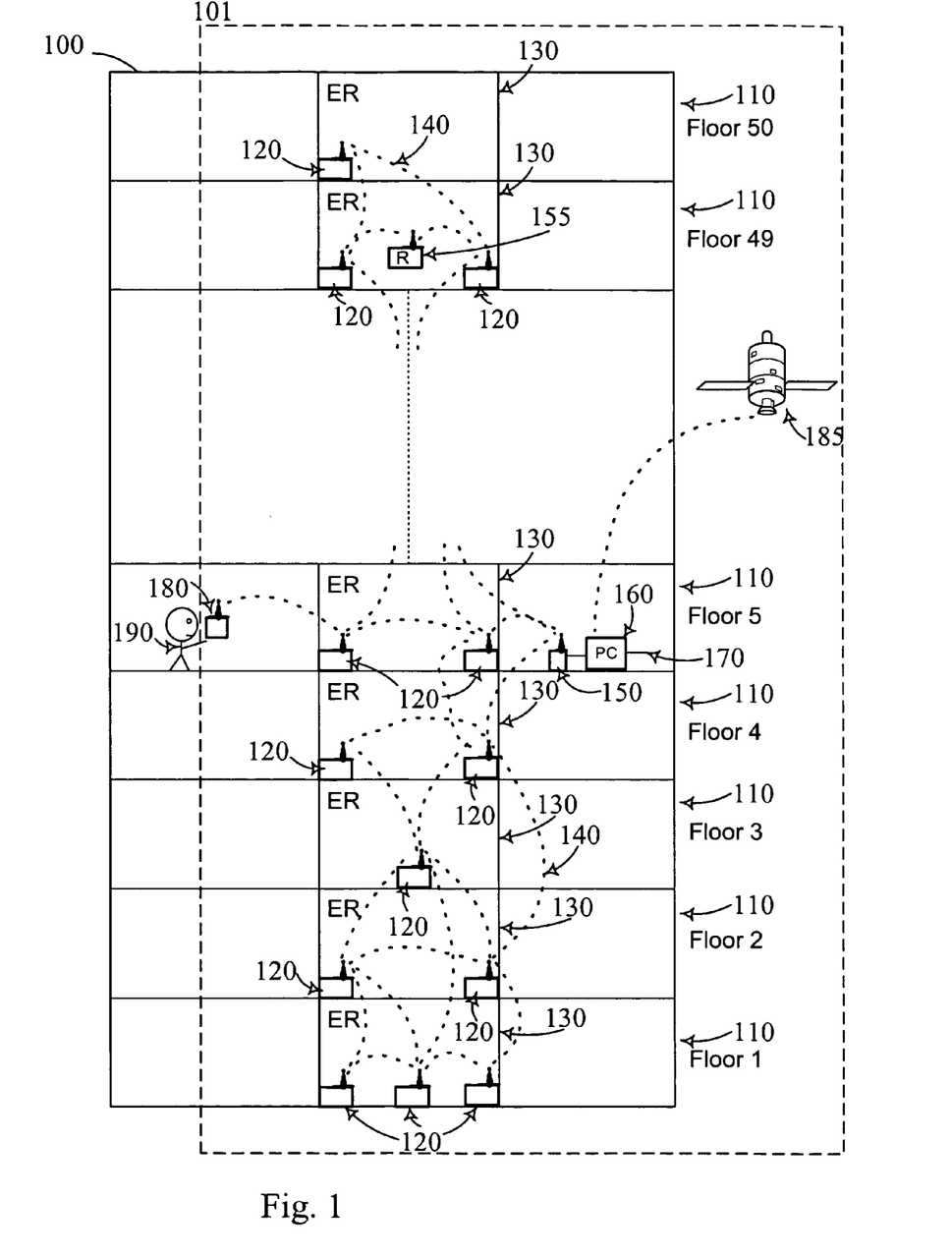
FIG. 1 depicts a block diagram of a commercial building incorporating an energy monitoring system according to one example.

FIG. 1 depicts an exemplary commercial office building 100 for use with the disclosed examples. The commercial office building 100 has a number of floors 110. Each floor may contain an electrical room 130. Alternatively there may be more than one electrical room 130 per floor or only one electrical room 130 per a number of floors. Within each electrical room 130 there may be one or more energy monitoring devices 120 within an energy monitoring system 101. The energy monitoring devices 120 communicate among each other to form a mesh network, depicted in FIG. 1 by multiple communications links 140 shown between the energy monitoring devices 120. It will be appreciated that fewer or more communications links 140 may be used between monitoring devices 120 and that the availability of a communications link 140 between any two monitoring devices 120 may fluctuate depending upon conditions such as interference, etc. Repeaters 155 may also be provided to facilitate communications between two devices 120 which may not otherwise be able to communicate due to distance, interference, etc. The mesh network also encompasses a gateway 150 which facilitates communications with a computer 160. The computer 160 may communicate energy data and other data over a LAN 170. The computer 160 and gateway 150 communicate over a serial or other form of communication link. Alternatively the gateway 150 may interface with the LAN 170 directly and the computer 160 may be connected to the LAN 170 in a different part of the building 100 and communicate with the gateway 150 over the LAN 170. The computer 160 may receive a time reference from a GPS satellite 185. Alternatively, the GPS satellite 185 signal may be received by an energy monitoring device 120, gateway 150 or repeater 155 within the mesh network. In this alternate case, the time within the alternate device becomes the reference for the energy monitoring system 101.

A user 190 may transport a portable communication device 180 around the building 100. This portable communication device 180 may be used as an alternate time source to computer 160. In addition, the portable communication device 180 may verify the time in energy monitoring devices 120 within its vicinity due to the fact that it will likely communicate directly with energy monitoring devices 120 close to it and therefore not have a large latency in receiving a packet from the energy monitoring devices 120 nearby.

Figure 2:
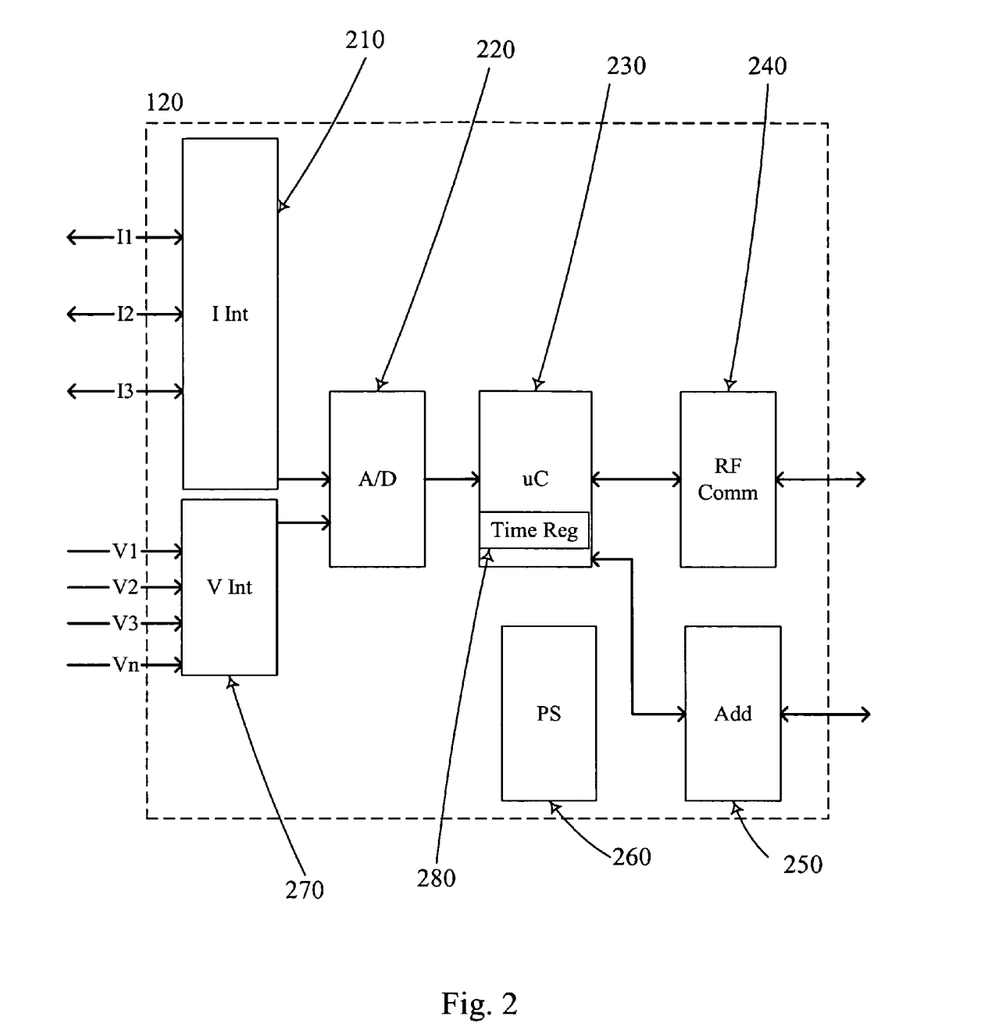
FIG. 2 depicts a block diagram of the internal circuitry of an example of an energy monitoring device for use with the energy monitoring system of FIG. 1.

FIG. 2 shows a block diagram of an energy monitoring device 120 according to one example. The energy monitoring device 120 includes electrical current interface circuitry 210 and electrical voltage interface circuitry 270. The electrical current interface circuitry 210 and electrical voltage interface circuitry 270 are operative to interface with power conductors which supply electrical energy to a certain load or area of the building 100. This interface may be direct or through appropriate current or voltage transformers. In alternative examples, the energy monitoring device may lack either the electrical current or electrical voltage interfaces 210, 270 depending upon the implementation and monitoring requirements of the device 120. The energy monitoring device 120 further includes an analog to digital converter 220, a micro-controller 230 coupled with the analog to digital converter 220, and RF communications circuitry 240 coupled with the micro-controller 230. The electrical current interface circuitry 210 and electrical voltage interface circuitry 270 scale the signals from the power conductors to voltage levels compatible with the analog to digital converter 220. The analog to digital converter 220 provides digital representations of the voltage and current in the power conductors to microcontroller 230. Using these signals, the microcontroller 230 calculates at least one power parameter such as kWh, kVAh, kVARh, kW demand, kVA demand, kVAR demand, etc. The microcontroller 230 transmits this power parameter(s) through RF communications circuitry 240 through the mesh network and gateway 150 to computer 160. The microcontroller 230 also maintains time for the energy monitoring device 100 in a memory register 280 which may be internal to and/or external to the microcontroller 230. The energy monitoring device 100 also contains a power supply 260 which may interface to the same voltage signals as the voltage interface circuitry 270 or to an alternative power source. Additional circuitry 250, such as wireline communications, I/O circuitry, etc. may also be provided in the energy monitoring device 120.

Several methods for time synchronizing the energy monitoring devices in the building 100 to a reference time will now be discussed. It will be appreciated that the described methods may be used alone or in combination to create hybrid time synchronization schemes without departing from the spirit and scope of the invention.

Figure 3:
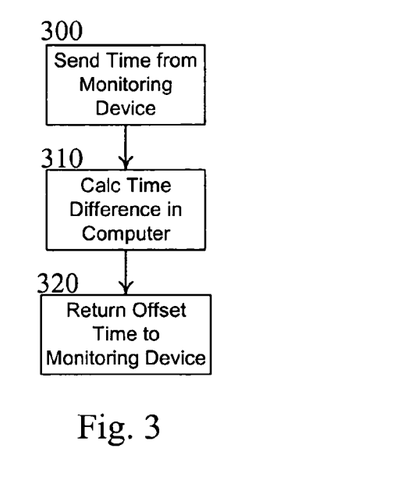
FIG. 3 depicts a block diagram of an exemplary procedure for time synchronizing the energy monitoring device of FIG. 2 according to one example.

FIG. 3 shows a first procedure for time synchronizing the energy monitoring device 120 with the computer 160, or other alternative time reference, according to one example. The procedure may be appropriate when the data transfer time of a packet from the energy monitoring device 120 to the computer 160 is short and less than the data transfer time of a packet from the computer 160 to the energy monitoring device 120. This may be due to the architecture of the mesh network. Periodically, the energy monitoring device 120 may determine that time synchronization is required. The determination period may be based on an expected time drift of a crystal or clock within the energy monitoring device 120, etc. When time synchronization is required, the energy monitoring device 120 sends its time into the mesh network destined for the computer 160 (block 300). When the computer 160 receives the packet, it calculates the difference in time between its time and the energy monitoring device 120 time in the packet (block 310). This difference may be adjusted by at least the minimum transmission time of the packet. This time difference is then returned to the energy monitoring device 120 in a subsequent packet and the energy monitoring device adjusts its time by the difference (block 320). In this way, the monitoring device 120 accounts for the transmission latency in sending data to the computer 160 and the accuracy in synchronization of the monitoring device 120 is not dependent on the latency in transmission of a packet from the computer 160 to the monitoring device 120.

Figure 4:
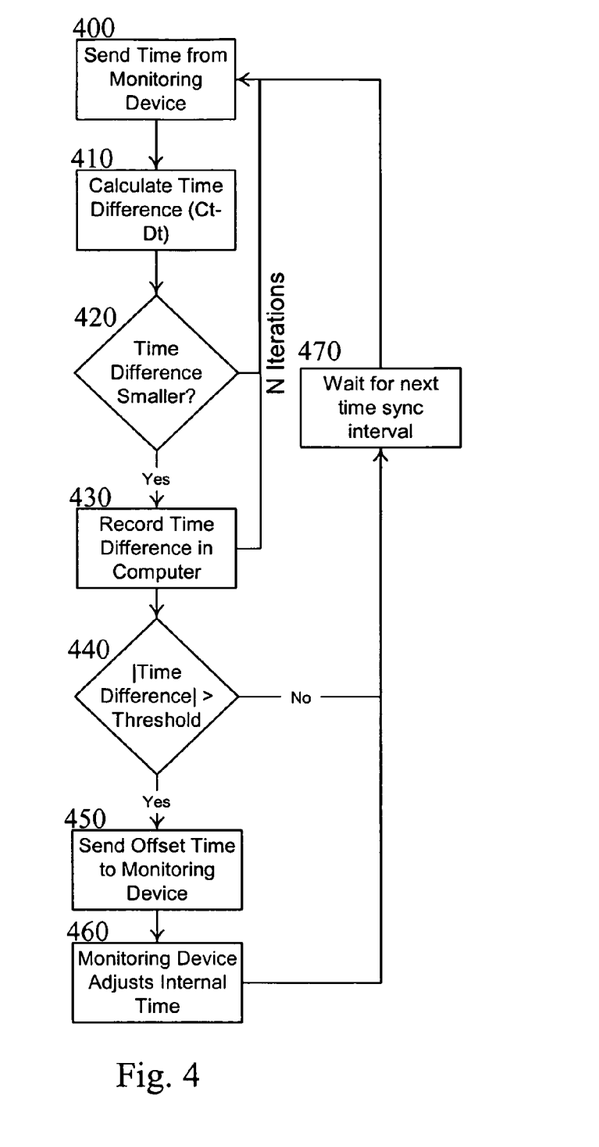
FIG. 4 depicts a block diagram of another exemplary procedure for time synchronizing the energy monitoring device of FIG. 2 according to an alternate example.

FIG. 4 shows a second procedure for time synchronizing the energy monitoring device 120 with the computer 160 according to one example. This procedure may be appropriate when the data transfer time of a packet from the energy monitoring device 120 to the computer 160 is variable, but at least some packets will arrive from the energy monitoring device 120 to the computer 160 within the desired time synchronization accuracy. Periodically, the energy monitoring device 120 may determine that time synchronization is required, as described above. When time synchronization is required, the energy monitoring device 120 sends its time into the mesh network destined for the computer 160 (block 400). When the computer 160 receives the packet, it calculates the difference in time between its time and the energy monitoring device 120 time in the packet (block 410). If this difference in time is less than any previous difference calculated during the synchronization sequence, the difference is recorded in the computer (block 430). The sequence of blocks 400-430 may continue for N iterations where N is an integer greater than or equal to 1 in order that the chances of a packet having a short transmission time through the mesh network is increased. If after the N iterations, the absolute value of the minimum time difference recorded is greater than a threshold (block 440), the difference is sent from the computer 160 to the energy monitoring device 120 (block 450) such that the energy monitoring device 120 may adjust its time (block 460). Otherwise, where the difference is already within allowable limits, correction is not necessary and the energy monitoring device 120 waits until the next time synchronization is required (block 470). In this way, synchronization adjustments are only made when the time difference between the computer 160 and the energy monitoring device 120 is more than a given threshold.

Figure 5:
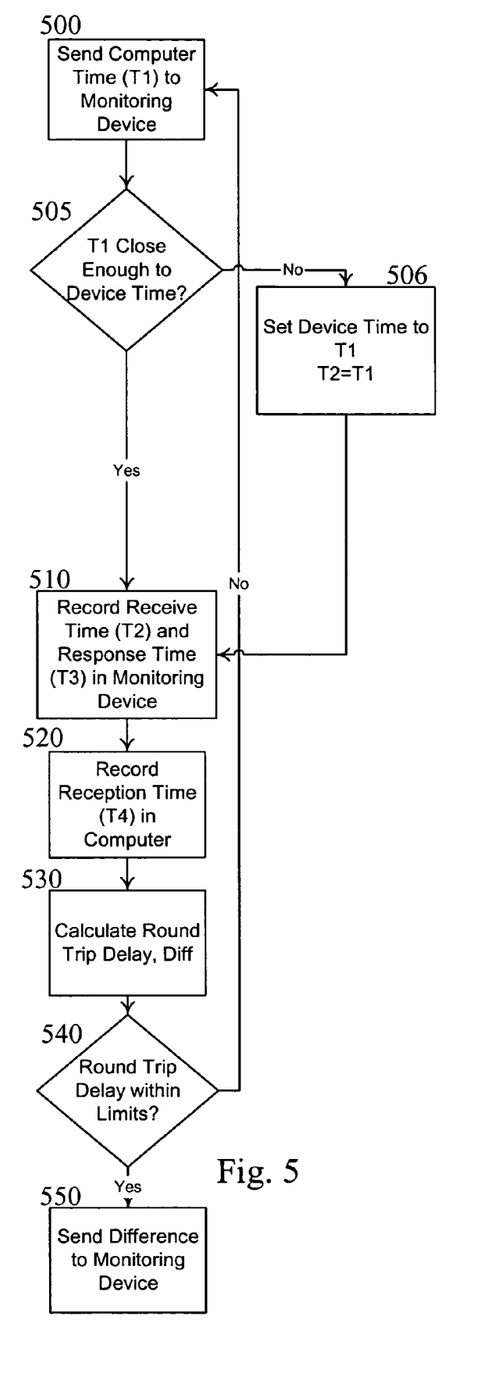
FIG. 5 depicts a block diagram of another exemplary procedure for time synchronizing the energy monitoring device of FIG. 2 according to yet another alternative example.

FIG. 5 shows a third procedure for time synchronizing the energy monitoring device 120 with the computer 160 according to one example. This procedure may be appropriate when the data transfer time of packets within the mesh network is variable, but at least some of the time, packets will travel the network fast enough to ensure the desired time synchronization accuracy is achieved. The procedure starts with the computer 160 sending its time (T1) in a packet to the energy monitoring device 120 through the mesh network (block 500). The energy monitoring device 120 receives this time (T1) and compares it to its time at reception (T2) (block 505).

If these times differ beyond an amount expected within the network (for example by more than 5 minutes), the energy monitoring device 120 may directly set its time to the time in the packet (T1) (block 506). This is so that the energy monitoring device gets at least a semi-accurate time as soon as possible and time differences may be represented in smaller registers (due to the maximum time difference having an upper bound). The energy monitoring device 120 records its time at reception of the packet (T2) and its time at response to the packet (T3) and returns these values to the computer 160 through the mesh network (block 510). The computer 160 records its time at reception of the return packet (T4) (block 520). The computer 160 then calculates the round trip delay (Trt=(T4−T1)+(T3−T2)) and the difference between the time in the computer 160 and energy monitoring device 120 (Td= [(T1−T2)+(T4−T3)]/2) (block 530). If the round trip delay (Trt) is less than a particular threshold, such as double the desired accuracy, the difference can be considered useable (block 540) and the difference can be returned to the energy monitoring device 120 in a subsequent packet such that the energy monitoring device 120 may adjust its internal clock (block 550). Otherwise, the procedure continues from block 500. Alternatively, this procedure may be initiated by an energy monitoring device 120.

Figure 6:
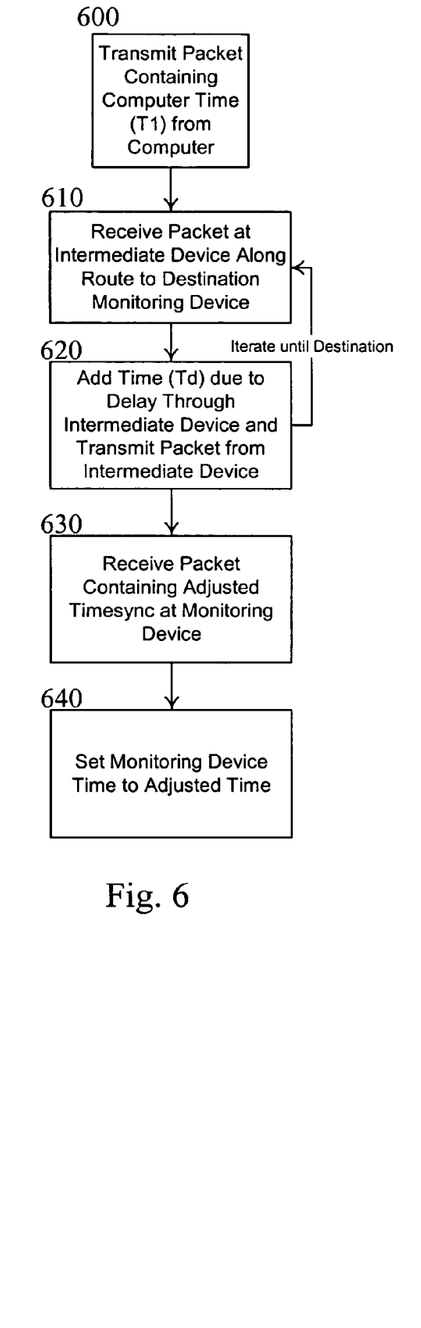
FIG. 6 depicts a block diagram of another exemplary procedure for time synchronizing the energy monitoring device of FIG. 2 according to yet another alternative example.

FIG. 6 shows a fourth procedure for time synchronizing the energy monitoring device 120 with the computer 160 according to one example. This procedure may be appropriate when the data transfer time of packets within the mesh network is known with a fair amount of accuracy. When it is determined that time synchronization is required, as described above, the computer 160 transmits a packet onto the network to one or more energy monitoring devices 120 (block 600). As the packet transitions through each energy monitoring device 120 on its way to the destination energy monitoring device 120, each energy monitoring device 120 in the path increases a time delay register in the packet by the amount that each intermediate energy monitoring device 120 has delayed the transmission of the packet (blocks 610, 620). When the packet arrives at the destination energy monitoring device 120 (block 630), the destination energy monitoring device 120 may set its time to the original time recorded in the packet by the computer 160 plus the total time delay through the intermediate devices (Td) (block 640). In addition, this procedure may take into account retries. For instance, an energy monitoring device 120 forwarding a packet may increase the time delay register in the packet by the elapse of time between an initial attempt to forward the packet and a subsequent attempt. A similar procedure can be executed by the gateway 150. For example, if it is known that the fastest an energy monitoring device 120 can store and forward a packet is 10 ms, it can be assumed for a message that hopped 50 times that at least 500 ms can be subtracted from the time offset. Each of the energy monitoring devices 120 that the packet transitions through may also accept the time synchronization information within the packet for local synchronization.

Once the computer 160 has received energy measurements from multiple energy monitoring devices 120 it can correlate the measurements. For instance, the computer 160 can add the kWh measurements from more than one energy monitoring device 120 to provide a combined energy usage value for a given floor, customer, section of the building, total building, etc. Alternatively, the computer 160 can calculate electrical demand over a given time period for a given floor, customer, section of the building, total building, etc. This information may be used in demand response programs for the entire building or a given section of it. The computer 160 can also add the total cost of energy for similar sections of the building. For instance, the computer 160 can combine at least two of electrical energy usage, gas usage, water usage, steam usage and compressed air usage into a total energy usage value.

In one example, the energy monitoring device 120 may employ methods to maintain accurate time keeping between synchronization such as by counting zero crossings or cycles of the voltage in the power conductors that are being monitored. These cycles may be used as a reference to maintain time between time synchronization procedures as described above. Since it will normally be known that the energy monitoring device 120 is connected to a 50 or 60 Hz power system, 50 or 60 cycles respectively of the power system is indicative of the passage of one second of time. This may reduce the frequency with which time synchronization procedures have to be executed.

In another example, the mesh networking architecture may provide a priority messaging system. A time synchronization packet may be sent at a high priority so that it encounters fewer delays through the mesh network. Using this architecture, at least one of the procedures described above may result in more accurate time synchronization.

In another example, the mesh networking architecture may provide for "quiet times". During these times, general packet traffic is quiesced or reduced such that a time synchronization packet can traverse the network with fewer delays due to other traffic. These quiet times may be initiated on a periodic basis or in response to a command sent from the gateway 150, computer 160, etc. Using this architecture, at least one of the procedures described above may result in more accurate time synchronization.

In another example, the time synchronization packets within the mesh network may comprises sequence numbers, keying sequences or other unique identifiers such that a device receiving the packet can detect a packet duplication to prevent duplicate time synchronization sequences. For instance when an energy monitoring device 120 receives a time synchronization packet, it compares a sequence number in that packet to the largest sequence number it has previously received. If the new sequence number is not greater than this, the packet is ignored.

Where appropriate in the above procedures, the procedure may be initiated at least a second time before the first execution of the procedure is complete. This may allow comparison of the results of the two executions and use of the results of the execution that result in the greatest time accuracy.

Where appropriate in the above procedures, adjustment of the time in a device may include a discrete adjustment and/or an adjustment to the rate of change of time within the device.

It will be noted that changing the time within a monitoring device 120 to cross a demand interval boundary has historically been a problem. Due to the fact that the computer 160 is aware of the amount of time adjustment made in many of the above procedures, adjustments to the demand calculations received from the energy monitoring devices 120 at the computer 160 can be made by the computer 160.

When the computer 160 requests energy monitoring data from an energy monitoring device 120 it may first send packets to the devices 120 that are furthest away, either physically/ geographically, i.e. furthest floor, or logically, i.e. in terms of the number of intermediate devices through which the communications must travel. In the illustrated example of FIG. 1, computer 160 would send a request to the energy monitoring device 120 on Floor 50 first, then the energy monitoring devices on Floor 49, etc. Since the request packets take longer (on average) to reach the energy monitoring devices 120 that are furthest away, network efficiency is optimized. This is due to the fact that in general the requests packets all traverse up the building together, each arriving at their respective floor, then all responses are generated and traverse back down the building. Of course due to the dynamic nature of the mesh network, some packets will get out of order, but in general, data flows in one direction through the network and then the other which may optimize the usage of available bandwidth.

It is therefore intended that the foregoing detailed description be regarded as illustrative rather than limiting, and that it be understood that it is the following claims, including all equivalents, that are intended to define the spirit and scope of this invention.

We claim:

1. A method of synchronizing a time period over which energy measurements are accumulated for an energy monitoring system including a plurality of energy monitoring devices, wherein the time period comprises a time interval at a predetermined time, the method comprising:
   (a) transmitting a first radio frequency packet from a time reference device via at least a first and a second of said plurality of energy monitoring devices to a third of said plurality of energy monitoring devices;
   (b) transmitting a second radio frequency packet containing a current time of said third energy monitoring device to said time reference device via at least said fourth and fifth energy monitoring devices;
   (c) calculating a time difference between said current time and a reference time of said time reference device;
   (d) updating said current time of said third energy monitoring device when said time difference exceeds a minimum time difference;
   (e) accumulating, over said time period, a measure of energy consumption by said third energy monitoring device of a load coupled with said third energy monitoring device;
   (f) transmitting said measure of energy consumption for said time period from said third energy monitoring device via at least a fourth and a fifth of said plurality of energy monitoring devices to a data aggregation device; and
   (g) identifying by said data aggregation device an aggregate measure of energy consumption consumed by said load over said time period.

2. The method of claim 1 further comprising:
   (h) transmitting a second radio frequency packet from said time reference device via at least said first and second of said plurality of energy monitoring devices to a sixth of said plurality of energy monitoring devices;
   (i) adjusting a second time register within said sixth energy monitoring device based on the reception of said second packet;
   (j) accumulating a third measure of energy consumption by said sixth energy monitoring device of a second load coupled with said sixth energy monitoring device;
   (k) transmitting said third measure of energy consumption from said sixth energy monitoring device via at least a seventh and an eighth of said plurality of energy monitoring devices to said data aggregation device; and
   (l) identifying by said data aggregation device a fourth measure of energy consumption consumed by said second load over said time period.

3. The method of claim 2 further comprising: (m) correlating the measure of energy consumption from said third and sixth energy monitoring devices within said computer.

4. The method of claim 1 wherein said measure of energy consumption comprises electrical demand over an aligned time period and further comprising storing said electrical demand in a database.

5. The method of claim 1 wherein said time reference device comprises at least one of a gateway, said data aggregation device, a GPS satellite and at least one of said energy monitoring devices.

6. The method of claim 1 further comprising:
   (h) repeating (b) and (c) at least once;
   wherein said minimum time difference is included with said first radio frequency packet and further wherein said current time is updated when said time difference exceeds said minimum time difference.

7. The method of claim 6 wherein said time difference is greater than ten seconds.

8. The method of claim 6 wherein (b) through (d) occur before (a).

9. The method of claim 1 further comprising:
   (h) transmitting a second radio frequency packet containing a current time of said time reference device via at least said first and said second energy monitoring devices to said third energy monitoring device;
   (i) generating a response to said second radio frequency packet within said third energy monitoring device, said response comprising a third radio frequency packet including at least one of a time of receipt in said third energy monitoring device of said second radio frequency packet and a time of response in said third energy monitoring device of said third energy monitoring device;
   (j) transmitting said third radio frequency packet via at least a seventh and an eighth energy monitoring devices to said time reference device;
   (k) recording the reception time of said third radio frequency packet at said time reference device;
   (l) calculating a time difference between said current time and a device time of said third energy monitoring device; and
   wherein said time difference is included with said first radio frequency packet.

10. The method of claim 9 wherein (h) through (l) occur before (a) and (b).

11. The method of claim 1 wherein (b) further comprises: compensating said time register for time delays caused during (a) by said first and second energy monitoring devices.

12. The method of claim 11, wherein:
    said first radio frequency packet further comprises a time of initiation of said transmitting; and
    said compensating further comprises adding said time delays to said time of initiation of said transmitting that is comprised within said first radio frequency packet.

13. A method of synchronizing a local time value maintained in each of a plurality of energy monitoring devices with a reference time value maintained in a data aggregation device, the data aggregation device and plurality of energy monitoring devices being interconnected by an RF ad-hoc network, the method comprising:
    (a) receiving time reference data transmitted by the data aggregation device via the ad-hoc network by a first energy monitoring device of the plurality of energy monitoring devices, the time reference data being communicated via at least a second of said plurality of energy monitoring devices, the time reference data being generated based on the reference time value;

(b) determining whether the local time value maintained in the first energy monitoring device is synchronized with the reference time value based on the received time reference data;
(c) adjusting the local time value maintained in the first energy monitoring device based on the time reference data where it is determined that the local time value maintained in the first energy monitoring device is not synchronized with the reference time value;
(d) acquiring data by the first energy monitoring device, the acquired data being associated with a first time period, the first time period being measured based on the local time value maintained in the first energy monitoring device; and
(e) transmitting the acquired data to the data aggregation device via at least a third of said energy monitoring devices in the ad-hoc network, wherein the data aggregation device has data associated with a second time period, further wherein the second time period is measured based on the reference time value and the first time period is substantially similar to the second time period due to the adjusting.

14. The method of claim 13 further comprising:
(f) receiving the time reference data transmitted by the data aggregation device via the ad-hoc network by a fourth energy monitoring device of the plurality of energy monitoring devices, the time reference data being communicated via at least a fifth of said plurality of energy monitoring devices, the time reference data being generated based on the reference time value;
(g) determining whether the local time value maintained in the fourth energy monitoring device is synchronized with the reference time value based on the received time reference data;
(h) adjusting the local time value maintained in the fourth energy monitoring device based on the time reference data where it is determined that the local time value maintained in the fourth energy monitoring device is not synchronized with the reference time value;
(i) acquiring second data by the fourth energy monitoring device, the second data being associated with a third time period, the third time period being measured based on the local time value maintained in the fourth energy monitoring device;
(j) transmitting the second data to the data aggregation device via the ad-hoc network to be associated with the second time period, the second time period being measured based on the reference time value, the third time period being substantially similar to the second time period due to the adjusting.

* * * * *